United States Patent [19]

Vasile et al.

[11] Patent Number: 4,619,311
[45] Date of Patent: Oct. 28, 1986

[54] EQUAL VOLUME, CONTRAFLOW HEAT EXCHANGER

[76] Inventors: Carmine F. Vasile; Sheila F. Vasile, both of 4 Cordwainer La., Huntington, N.Y. 11743

[21] Appl. No.: 749,662

[22] Filed: Jun. 28, 1985

[51] Int. Cl.⁴ ............................................. F24H 3/00
[52] U.S. Cl. ..................................... 165/47; 165/909; 165/914
[58] Field of Search ................. 165/47 BW, DIG. 12, 165/174, 154, 909, 914; 126/362; 4/598; 237/19

[56] References Cited

U.S. PATENT DOCUMENTS 4,341,263  7/1982  Arabian ............................. 165/47 X
4,352,391 10/1982  Jonsson ............................. 165/47 X

FOREIGN PATENT DOCUMENTS 3011111 10/1981  Fed. Rep. of Germany ........ 165/47

Primary Examiner—Henry Bennett
Attorney, Agent, or Firm—F. R. Agovino

[57] ABSTRACT

A system for recovery systems improving heat recovery from hot waste water is provided whereby cold feed water is preheated by means of extracting heat from hot waste water by passing said hot waste water and said cold feed water through a heat exchanger. Said preheated feed water is directed simultaneously to the hot water heater and to mixing valves at the point of usage of tepid water. Equal volumes of waste water and cold feed water flow through the system.

4 Claims, 2 Drawing Figures

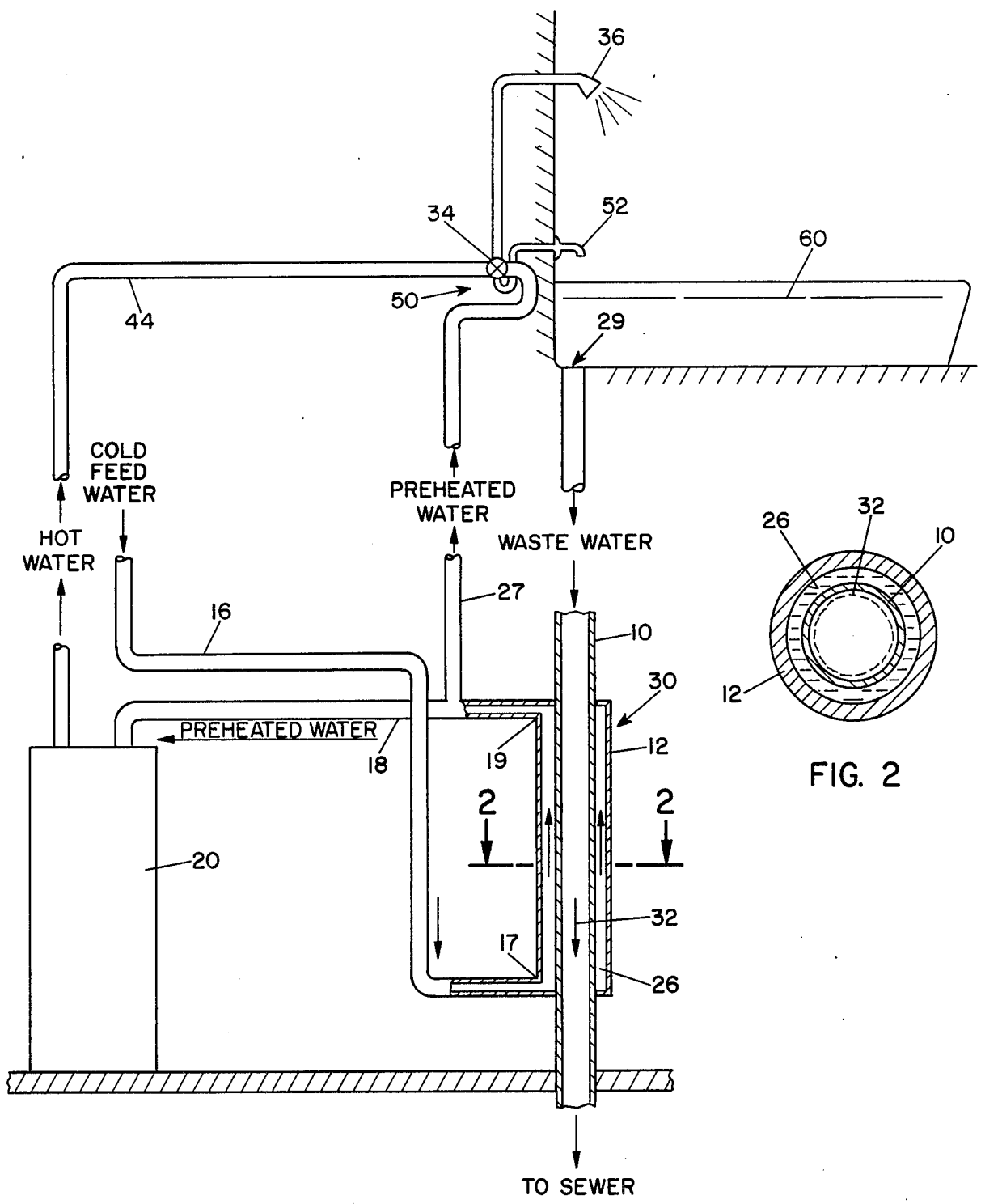

EQUAL VOLUME, CONTRAFLOW HEAT EXCHANGER

BACKGROUND OF THE INVENTION

1. Field of the Invention

The instant invention relates to a system for improving heat energy recovery from waste hot water whereby cold feedwater is preheated and then further heated and stored in a hot waterheater. Simultaneously, the system also provides for the preheated cold feed water to be mixed with hot water for direct use as tepid water.

The system further provides for multiple user operation at little additional expense and does not require additional storage or buffer tanks or other complex accessories.

2. Description of the Prior Art

The prior art is exemplified by many examples of heat reclaimation systems, most of which are expensive, complicated and require periodic cleaning and maintenance in order to avoid fouling and/or degradation of heat recovery efficiency; examples of which are shown in U.S. Pat. Nos. 4,304,292; 4,300,247; 4,150,787; 4,352,391 and 4,372,372. However, as will be seen herein, there are no existing systems that are as simple, versatile and inexpensive as the instant invention.

SUMMARY OF THE INVENTION

In the present invention, the disadvantages of the prior art are overcome by using a relatively simple heat exchanger configuration having a sufficiently large inside diameter and proper orientation such that waste water is discouraged from filling said heat exchanger, but is instead encouraged to flow rapidly through said heat exahanger in the form of a film providing self-cleaning, non-fouling, maintenance-free operation.

Although said waste water spends a short period of time in transversing said heat exchanger, significant waste heat energy can be recovered by clever design which benefits from a combination of natural forces due to the earth's gravity and rotation which cause the waste water to spread out in a relatively thin sheet, against the inner wall of said heat enchanger, where, said waste water can be placed into thermal contact with cooler water destined for use as water heater feedwater and/or the production of tepid water by mixing with hot water, for example, as in showering.

The use of said heat exchanger in this manner is inventive because we teach herein that said heat exchanger must not be filled with waste water whereas prior art teaches that the heat exchanger must be filled with waste water. This allows the waste water to flow as a film. Furthermore, said heat exchanger provides an equal volume and opposite counterflow design which is simple, whereas prior art heat exchanger designs are more complicated as they often include means for cleaning and maintaining.

Finally, due to the simplicity of said heat exchanger design, sewage and the like can pass through, whereas prior art heat exchangers will likely foul if sewage were to enter the waste water inlet.

Thus, the non-fouling property of the present invention enables said heat exchanger to be inserted directly into a main waste water line and thereby efficiently recover waste heat produced by multiple sources, located for example, at various places in a multi-family dwelling, or the like.

DESCRIPTION OF THE DRAWING

FIG. 1 of the drawing shows a system whereby cold feed water is preheated in a heat exchanger and is then further heated and stored in a conventional hot water heater. The same heat exchanger is used via pipe 27 to reduce the quantity of hot water required in preparing a tepid water mixture for direct use as in showering, for example.

FIG. 2 of the drawing is a cross section along lines 2—2 and shows the cross section of a typical heat exchanger according to the invention.

DESCRIPTION OF THE PREFERRED EMBODIMENT

The prior art includes many techniques for the recovery of heat energy contained in waste water. As disclosed, for example, in U.S. Pat. Nos. 4,304,292; 4,300,247; 4,321,798; 4,150,787; 4,352,391 and 4,372,372, water used for showering, as well as other purposes, and discharged through drain lines can be placed into a heat exchange relationship with colder feed water in order to preheat either water heater feed water and/or cold water prior to mixing with hot water to provide tepid water for direct use. (See also A.A. Field, Heating/Piping/Air Conditioning, Volume 48, No. 3, pp. 87–91, "Solar Energy: Part II, The Continent," March 1976.)

Said heat exchange relationship conserves energy by lowering the temperature of said waste water by transferring heat energy to said feed water, or said cold water, or both, thereby reducing primary hot water heater input energy requirements and the quantity of hot water used in showering, for example. The present invention is directed at installations whereby tepid water is produced by mixing hot and cold water in a mixing valve 34, for example.

Referring to FIGS. 1 and 2 of the drawing, cold feed water enters the system through cold water pipe 16 which is connected to heat exchanger 30 at inlet 17 and exits heat exchanger 30 as preheated feed water at outlet 19 which is communicated to hot water heater 20 by pipe 18 where said preheated feed water is further heated and stored for domestic hot water requirements. Waste water pipe 10 is provided to take the waste water from bathtubs, sinks, showers, hot industrial equipments and etc., and communicate same to the sewer.

The inventive feature illustrated in FIG. 1 is the use of a substantially vertically oriented heat exchanger 30, that is inserted directly into a common drain conduit 10. Exchanger 30 pre-heats a volume of feed water 18 and cold water 27 equal to the waste water volume from drain 29 of tub 60 prior to mixing 50 with hot water 44 in valve 34, having shower outlet 36 and bath outlet 52, for example. Jönsson (U.S. Pat. No. 4,352,391) teaches usage of a more complicated heat exchanger without equal volume flow.

Jönsson and others, however, fail to teach the significance of preheating both feed water 18 and cold water 27 prior to mixing 27 so that equal volumes of cold and waste water are flowing through the exchanger at the same rate. For example, if 1.5 gpm of cold water 50 were mixed with 1.5 gpm of hot water 44, 3.0 gpm would flow as waste water 32 at a temperature equal to the average of the premixed two water temperatures. If, as Jönsson or Hunter (U.S. Pat. No. 4,372,372) teaches, one installed an optimized heat exchanger having an effectiveness of 80%, for example, the best one can extract is about 40% of the waste water heat energy. This is because, in accordance with the laws of thermodynamics, the volume of the waste water is twice that of the cold water to which it is transferring heat.

The present invention, however, teaches a method for causing equal volumes of waste water 32 and cold feed water 16 to exchange heat energy. Thus, in the present invention, a similar 80%, not 40%, of the heat energy is extracted from in the waste water. This is the essence of the present invention. Buffer storage tanks are therefore not required in order to achieve cost effective waste heat recovery.

The system according to the invention will operate most efficiently if heat exchanger 30 is mounted with a substantially vertical orientation with waste hot water 32 in waste water pipe 10 spiraling around the inner metal walls of said pipe as indicated in FIG. 2. Sense of pitch should be in such a direction as to enhance natural spiraling due to Coriolis effect (e.g. in Northern Hemisphere clockwise when viewed downward.) In installations where vertical mounting is not possible, such as in homes without basements, a pump system togehter with flow control valves would then be required to raise the waste water up to the level of the heat exchanger input for the purpose of achieving useful heat recovery efficiency and ensure self-cleaning, non-fouling, maintenance-free operation of the heat exchanger. In many installations, waste water 32, for example, will have gained sufficient speed and centrifugal force due to gravity and the earth's rotation to produce efficient heat exchange.

As shown in FIGS. 1 and 2, co-axial contraflow heat exchanger 30 is provided and comprises an inner waste pipe 10 that carries waste water from the sources such as the bathtubs, shower stalls and sinks to the sewer for disposal. The heat exchanger design may be of various types. As shown in FIG. 2, waste pipe 10 is surounded by a jacket of cold feed water 26 which in turn is contained by outer pipe 12. The waste hot water 32 in waste pipe 10 and cold feed water 26 flow in opposite directions to one another. This contraflow yields a more efficient heat exchange between the hot waste water and cold feed water than codirected flow.

The materials of construction may be of various types such as copper and aluminum for waste pipe 10 and cold water pipe 46 and for outer pipe 12 material such as PVC may be used although other materials may be substituted. Teflon coating on the inside wall of pipe 10 may be helpful in minimizing efficiency losses due to sewage fouling of its inner surfaces. Preferably, drain 29 has a smaller diameter than the diameter of waste pipe 10 so that waste water 32, flowing downward, is encouraged to form a film about the inner surface of inner cylindrical pipe 10. This also prevents waste water 32 from filling pipe 10.

Two or more heat exchangers may be used in tandem to increase the efficiency of heat transfer.

While the form of apparatus herein described constitutes a preferred embodiment of the invention, it is understood that the invention is not limited to this precise form of apparatus and that changes may be made therein without departing from the scope of this invention.

What is claimed is:

1. An apparatus for use in combination with a water heating system wherein the system includes (1) a cold water feed;
(2) a water heater having an inlet connected to the cold water feed and a hot water outlet, and
(3) a facility connected to the cold water feed and the hot water outlet and having a waste pipe for carrying mixed hot and cold water, the facility having a means for mixing the cold and hot water and immediately providing the mixed water to the waste pipe;

said apparatus comprising:
(a) first means including a cylindrical member connected to the waste pipe for directing the flow of the mixed hot and cold water in the form of a film spiraling downward over the inner surface of the cylindrical member; and
(b) second means connected in-line with the cold water feed prior to the cold water feed connections to the facility and prior to the cold water feed connections to the water heater for directing the flow of cold water flowing in the cold water feed upward in contact with the outer surface of the cylindrical member, said second means directing the cold water flowing in contact with the outer surface of the cylindrical member in a direction opposite to the direction of flow of the mixed hot and cold water flowing in contact with the inner surface of the cylindrical member whereby the volume of water flowing through the first means is equal to the volume of the water flowing through the second means.

2. The apparatus of claim 1 wherein said first means is a vertical pipe and said second means is a jacket surrounding the vertical pipe.

3. An apparatus for transferring heat to a first fluid supplied by a cold water feed pipe which supplies cold water to a hot water heater, said heat being supplied from a waste water supply from a facility resulting from the mixing of water from the cold water feed and heated water from the hot water heater, said apparatus comprising:

a vertical pipe connected to the first source pipe and having a diameter greater than the diameter of the first source pipe, the vertical pipe directing the flow of the first fluid in the form of a film spiraling downward over the inner surface of the vertical pipe;

a jacket surrounding the vertical pipe and connected to the second source, the jacket having an inlet and an outlet and directing the flow of the second fluid upward over the outer surface of the vertical pipe; and means for controlling the volume of the second fluid flowing through the jacket so that the flow rate of the second fluid flowing through the jacket equals the flow rate of the first fluid flowing through the vertical pipe; wherein said means for controlling is:

a first pipe interconnecting the waste water supply and the vertical pipe;

a second pipe connecting the jacket inlet to the cold water feed supply prior to supplying cold water to the hot water heater and prior to supplying cold water to the facility; and a third pipe connecting the jacket outlet to the hot water heater and to the facility, the third pipe for supplying cold water to the hot water heater and to the facility.

4. The apparatus of claim 3 wherein the second fluid is a cold water feed which supplies cold water to a hot water heater and the first fluid is a waste water supply from a facility resulting from the mixing of water from the cold water feed and heated water from the hot water heater; and wherein said means for controlling is:
- a first pipe interconnecting the waste water supply and the vertical pipe,
- a second pipe connecting the jacket inlet to the cold water feed supply prior to supplying cold water to the hot water heater and prior to supplying cold water to the facility; and
- a third pipe connecting the jacket outlet to the hot water heater and to the facility, the third pipe for supplying cold water to the hot water heater and to the facility.

* * * * *